(12) United States Patent
Ling et al.

(10) Patent No.: US 7,729,567 B2
(45) Date of Patent: Jun. 1, 2010

(54) FIBER OPTIC TRANSDUCER FOR SIMULTANEOUS PRESSURE AND TEMPERATURE MEASUREMENT IN FLUID FLOW

(75) Inventors: Hang-yin Ling, Hong Kong (HK); Yong-ping Zheng, Hong Kong (HK); Kin-tak Lau, Hong Kong (HK); Pou-man Lam, Hong Kong (HK)

(73) Assignee: The Hong Kong Polytechnic University, Kowloon (HK)

( * ) Notice: Subject to any disclaimer, the term of this patent is extended or adjusted under 35 U.S.C. 154(b) by 0 days.

(21) Appl. No.: 11/798,343

(22) Filed: May 14, 2007

(65) Prior Publication Data

US 2008/0285908 A1 Nov. 20, 2008

(51) Int. Cl.
G02B 6/00 (2006.01)
G02B 6/34 (2006.01)

(52) U.S. Cl. .......................... 385/13; 384/37
(58) Field of Classification Search ............ 385/12, 385/13, 37
See application file for complete search history.

(56) References Cited

U.S. PATENT DOCUMENTS

| | | | |
|---|---|---|---|
| 5,040,415 A * | 8/1991 | Barkhoudarian | 73/198 |
| 5,083,452 A * | 1/1992 | Hope | 73/61.49 |
| 5,218,197 A * | 6/1993 | Carroll | 250/227.19 |
| 5,367,911 A * | 11/1994 | Jewell et al. | 73/861.08 |
| 5,591,922 A * | 1/1997 | Segeral et al. | 73/861.04 |
| 5,987,197 A * | 11/1999 | Kersey | 385/24 |
| 6,278,811 B1 * | 8/2001 | Hay et al. | 385/13 |
| 6,450,037 B1 * | 9/2002 | McGuinn et al. | 73/705 |
| 6,563,970 B1 * | 5/2003 | Bohnert et al. | 385/13 |
| 6,782,150 B2 * | 8/2004 | Davis et al. | 385/12 |
| 6,785,004 B2 * | 8/2004 | Kersey et al. | 356/478 |
| 6,860,095 B2 | 3/2005 | Tao et al. | |
| 6,959,604 B2 * | 11/2005 | Bryant et al. | 73/705 |
| 7,004,038 B2 * | 2/2006 | Tsai | 73/861.71 |
| 7,164,813 B2 * | 1/2007 | Bugaud | 385/13 |
| 7,261,002 B1 * | 8/2007 | Gysling et al. | 73/861.42 |
| 7,308,165 B2 * | 12/2007 | Arias Vidal et al. | 385/13 |
| 7,587,948 B2 * | 9/2009 | Gysling et al. | 73/861.42 |

* cited by examiner

*Primary Examiner*—Uyen-Chau N Le
*Assistant Examiner*—John M Bedtelyon
(74) *Attorney, Agent, or Firm*—Kauth, Pomeroy, Peck & Bailey LLP

(57) ABSTRACT

The present invention relates a fiber optic transducer (FOT) and methods for measuring the pressure and temperature of a flowing fluid using such FOT, wherein such FOT contains a fiber optic having fiber Bragg gratings. The fiber Bragg gratings are measured during a flowing fluid to determine the difference in the change in wavelength exhibited by a reflected optical signal from the gratings.

11 Claims, 4 Drawing Sheets

FIBER OPTIC TRANSDUCER FOR SIMULTANEOUS PRESSURE AND TEMPERATURE MEASUREMENT IN FLUID FLOW

BACKGROUND

Fluid flow measurement has been noted as being important in our lives. The flow meters in use today are, generally, manually read or electrical meters. The prior art has disclosed the use of optical fiber in measuring flow, but generally, as in the earlier used meters, measurement is of one type: velocity or pressure measurement. No current device or invention has focused on the measurement of temperature and pressure simultaneously through the use of one flow measuring device.

It is an object of the present system to provide devices and methods for the simultaneous measurement of pressure and temperature of a fluid, thus improving upon the prior art.

DESCRIPTION

The present invention proposes apparatuses for measuring pressure and temperature of a flowing fluid simultaneously.

The present invention also proposes to measure pressure and temperature with a device containing an optical fiber possessing two fiber Bragg gratings, such optical fiber positioned within a tube.

The present invention further proposes the measurement of both pressure and temperature to provide a more accurate, reliable, and highly sensitive fluid flow measurement method.

These and other features, aspects, and advantages of the apparatus and methods of the present invention will become better understood from the following description, appended claims, and accompanying drawings where:

FIG. 4, in reference to the Example, graphs temperature and pressure against wavelength shift.

The following description of certain exemplary embodiment(s) is merely exemplary in nature and is in no way intended to limit the invention, its application, or uses. Throughout this description, the term "fluid" refers to a gas, liquid, or gel possessing a pure to doped composition.

Figure 1:
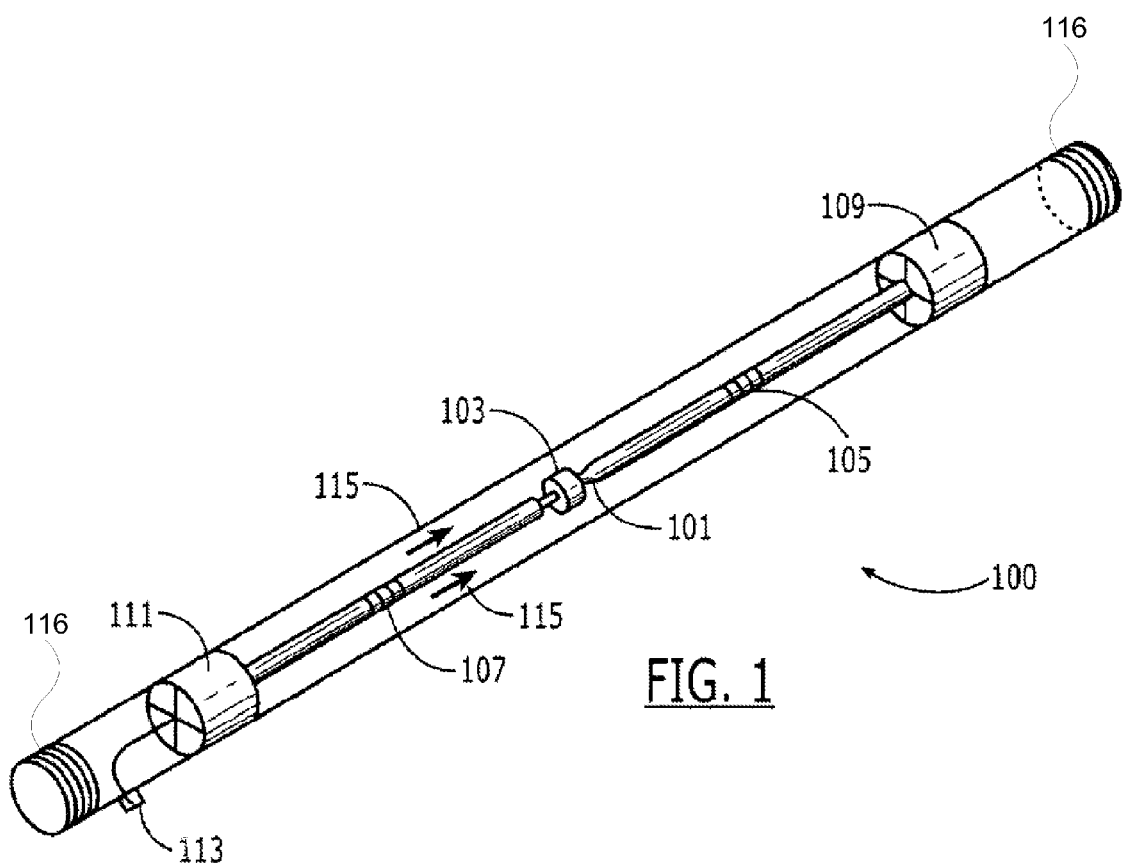
FIG. 1 shows an optical fiber transducer (FOT) made in accordance with the present invention.

Now, to FIGS. 1-4,

FIG. 1 shows a fiber optic transducer (FOT) apparatus 100 of the present invention, such FOT including an optical fiber 101, a strain inducing device 103 such as a round platter-shaped disk, gratings 105/107, clamping means 109/111 for position-fixing the optical fiber 101, and an optical fiber head connector 113.

The optical fiber 101 used in the apparatus 100 can be a standard optic fiber as used in the art, such as a single mode or multimode. The fiber 101 may be doped, such as by Germanium or Phosphorous pentaoxide ($P_2O_5$).

The gratings 105/107 of the apparatus 100 are located on the fiber 101. The gratings 105/107 are preferably fiber Bragg gratings. When the apparatus 100 is in use, the gratings 105/107 are subject to geometric property changes.

These geometric property changes take the form of alterations in tension and compression of the gratings 105/107. The wavelength, as measured from the apparatus to a detector, changes in response to the geometric property change. The fluid's pressure as exerted on the strain inducing device 103 is determined by the difference between the shift of wavelengths of the gratings 105/107. The fluid's temperature can be calculated by the extraction of the change of the wavelength caused by the pressure effect from the wavelength shift of either grating 105/107. The number of gratings on the optical fiber 101 can range from 1-∞.

Clamping means 109/111 are used for holding the optical fiber 101 in position. The clamping means 109/111 are preferably T-shaped in order to avoid direct interaction between the flowing fluid and the gratings 105/107. If such direct interactions were to occur, the gratings 105/107 may be subjected to non-uniform strain. Prior to mounting the clamps 109/111 inside the apparatus 100, the optical fiber is strained.

The optical fiber head connector 113 is connected to a light source and detector (not shown). As will be discussed later, the connector 113 may alternatively be connected to a controller system. Through the connector 113, a light signal is provided to the gratings 105/107. As the gratings 105/107 undergo geometric changes (tensing and compressing), a reflected light signal, possessing characteristics of the geometric changes, is sent to and captured by the detector.

The connector 113 can be standard equipment used in the industry, and can include parts such as Ferrule, springs, crimping rings, housing, and boots. Example of suitable connectors include but are not limited to SMA, STC, biconic, face-end, paint contact, D3, D4, epoxy less, SC, FDDI, E2000, DIN, ESCON, and MT.

In use, a light source delivers an optical signal to the gratings 105/107 via the optical fiber 101. Along the flow direction 115, the gratings 107 and 105 are subjected to tensile strain and compressive strain, respectively. The induced mechanical strains is due to the movement of the plate 103 caused by the flow of the fluid in the apparatus 100. The tensile strain on the grating 107 and the compressive stain on grating 105 lead to an increase and decrease in their respective wavelengths.

The thermo-effect of the flowing fluid also induces the thermal strain of both gratings 105/107. The optical signal transmitted through the optical fiber 101 and the optical signal reflected from the gratings 105/107 shift in phase in response to the thermal strain to which the gratings 105/107 are subjected.

The net effect of the fluid pressure exerted on the plate 103 is determined by the difference between the shift of the wavelengths of the gratings. While the fluid temperature is calculated by the extraction of the change of the wavelength caused by the pressure effect from the wavelength shift of either grating. A signal is obtained from the optical fiber by summing the transmitted light ray and reflected light ray changes in response to a change in strain.

A detector is used for converting the optical signal resulting from the optical fiber into measurement of pressure and temperature of the flowing fluid.

The detector can be an analog or digital receiver, and can include components such as preamplifier, amplifier, demodulators, filters, and comparators. The detector is preferably a photodetector. In one embodiment, the detector can be connected, through wired, wireless, or incorporation, to a computer system, for analyzing, storing, or comparing signals from the optical fiber 101. Such a computer system can include a display, user interface devices such as keyboard, temporary storage such as RAM, permanent storage such as ROM, microprocessor, and operational algorithms.

To some preferred conditions of the apparatus 100, the shape (tube) of the clamps 109/111 provide non-bending environment of the gratings 105/107 in order to maintain high intensity of the relation spectrum during the measurement. Screw slots 116 are preferably on the apparatus 100 to increase the feasibility of the apparatus 100 for the installation in a pipe with different boundary conditions.

The fastening of the optical fiber 101 upon the clamps 105/107 facilitates the apparatus 100 working well in any direction without considering the gravitational effects.

FIG. 2 (A-C) shows the shift in wavelengths as measured by the detector in determining fluid pressure or temperature.

Figure 2A:
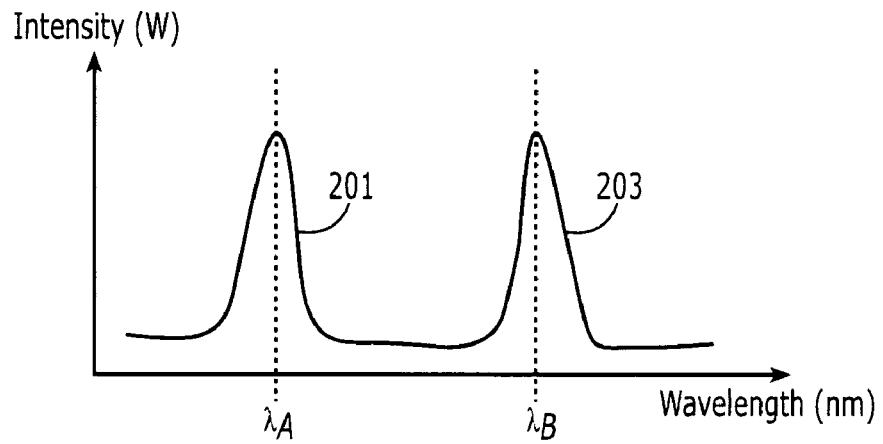
FIG. 2 shows the theory of utilizing wavelength shift by the gratings as relating to pressure and temperature measurements.

FIG. 2A exhibits the initial wavelength difference between the two gratings (A and B) positioned on the fiber optic. $\lambda_A$ and $\lambda_B$ are the intial Bragg's wavelengths of gratings A and B at a pre-strained state under room temperature.

In this case, $\Delta\lambda_O = \lambda_B - \lambda_A$

Figure 2B:
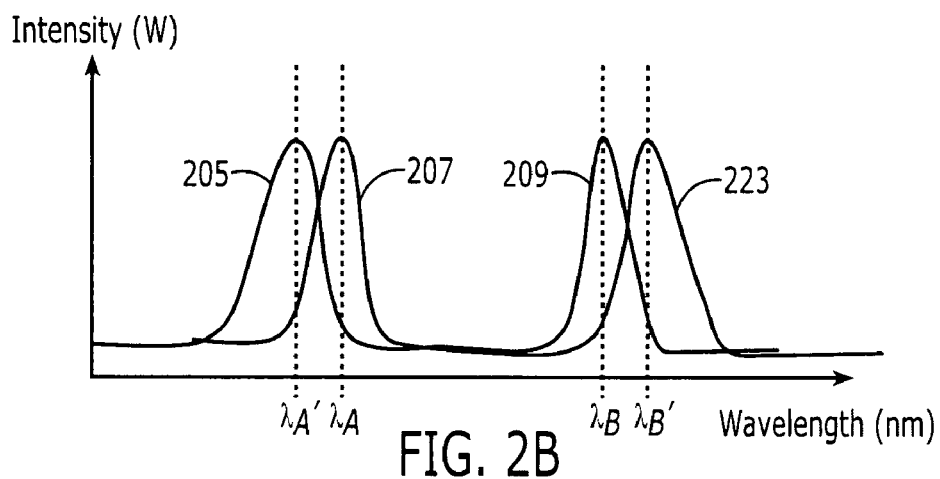

FIG. 2B exhibits the change in wavelength from gratings A and B as induced by fluid flow under room temperature.

$$\Delta\lambda_\varepsilon = \frac{(\lambda'_B - \lambda'_A) - \Delta\lambda_0}{2}.$$

Figure 2C:
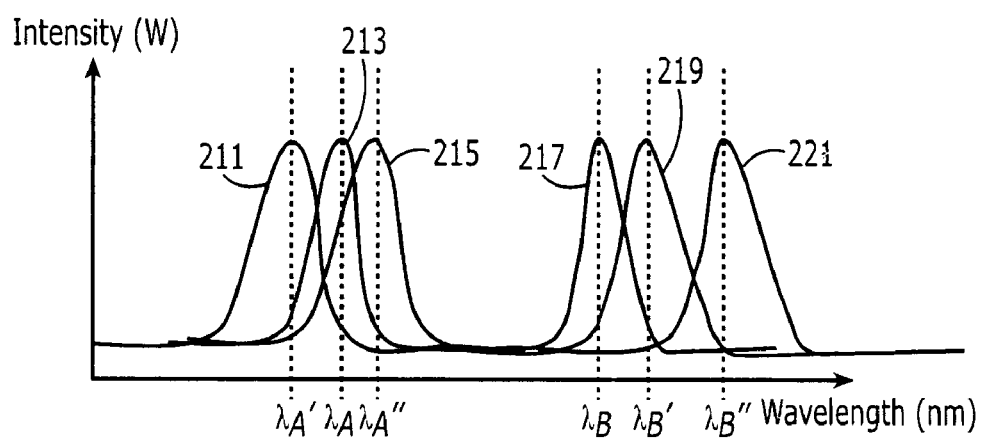

FIG. 2C exhibits the change in wavelength from gratings A and B as induced by fluid flow with increased temperature. The change of the Bragg's wavelength due to the induced strain by the flowing fluid with increasing temperature, $$\Delta\lambda_{\varepsilon T} = \frac{(\lambda''_B - \lambda''_A) - \Delta\lambda_0}{2}$$

The change of the Bragg's wavelength due to the temperature change of the flowing fluid, $$\Delta\lambda_T = (\lambda''_B - \lambda_B) - \frac{(\lambda''_B - \lambda''_A) - \Delta\lambda_0}{2}$$

Figure 3:
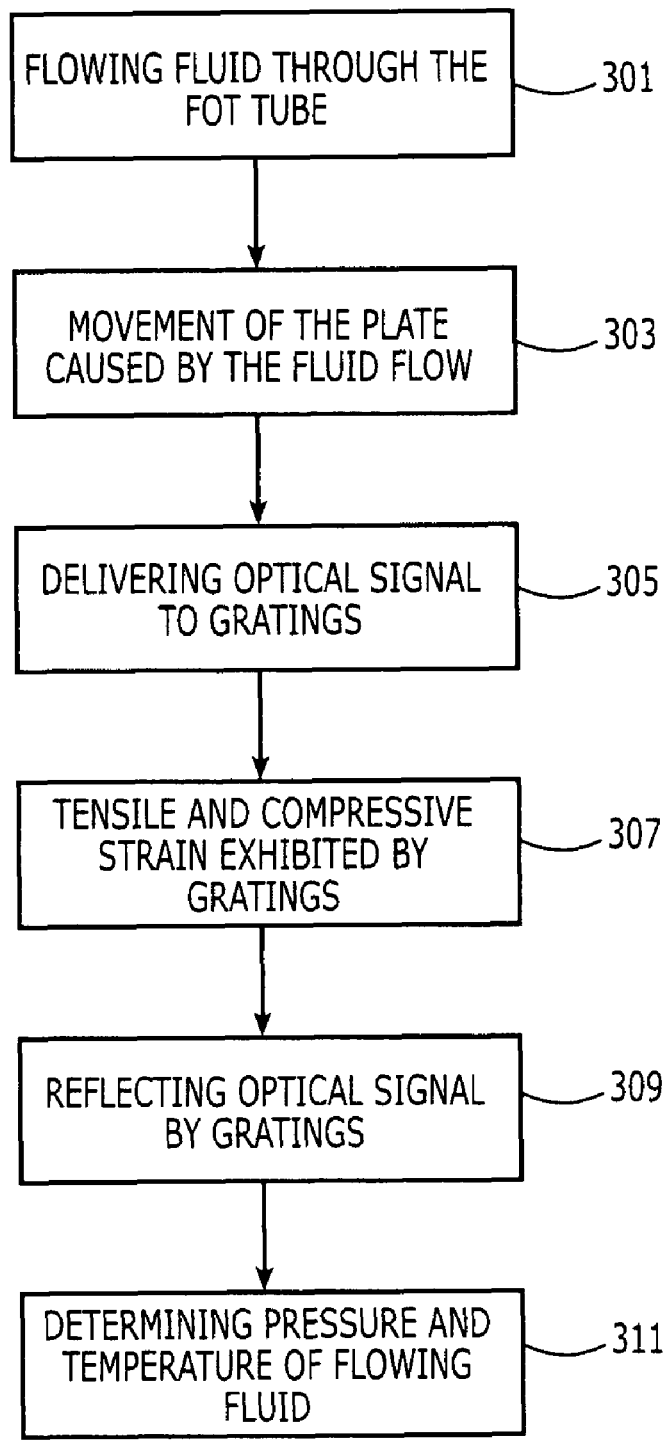
FIG. 3 shows a method of measuring pressure and temperature of a flowing fluid in accordance with the present invention.

FIG. 3 is a method of simultaneous determination of pressure and temperature of a flowing fluid using a FOT of the present invention, including the steps of flowing fluid through the FOT tube 301, movement of the plate, within the FOT tube, by the flowing fluid 303, delivering an optical signal to the gratings on the optical fiber 305, noting the tensile and compressive stain exhibited by the gratings 307, reflection of the optical signed by the gratings 309, and determining the pressure and temperature of the flowing fluid 311.

As stated previously, the method allows the simultaneous determination of the fluid's pressure and temperature.

In allowing the flowing fluid into the FOT Transducer 301, the FOT transducer can include screw slots 116 allowing the transducer to be inserted into an accommodating tube.

Upon the fluid flowing through the tube 301, the plate within the FOT moves in response to the flow 103. The result of the plate movement 103 is tensile and compressive strain exhibited by the gratings. While the fluid flows, a light source delivers an optical signal to the gratings 309. The delivery of an optical-signal to the gratings and receipt of the reflections therefrom while the gratings exhibit tensile and compressive strain allow the determination of pressure and temperature of the flowing fluid 311.

As discussed previously, the determination of pressure and temperature 311 is performed by measuring the fiber Bragg wavelengths of the reflected optical signal in an initial state and during states when the gratings are subject to strain. Measurement is preferably performed by a detector. The pressure is determined by the difference between the shift of the wavelengths; the fluid temperature is calculated by the extraction of the change of the wavelength caused by the pressure effect from the wavelength shift of either grating.

EXAMPLE

FIG. 4 (A and B) shows measurements of a flowing fluid's pressure and change in temperature as compared to Bragg wavelength shifts, as performed by the apparatus of the present invention.

Figure 4A:
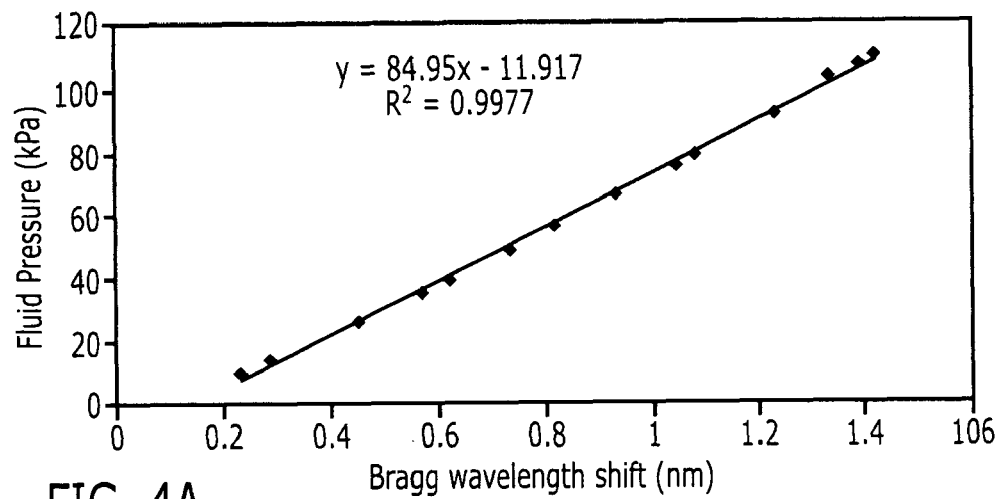

As shown in FIG. 4(A), an increase in the fluid pressure results in a larger wavelength difference between the two gratings on the fiber optic.

Figure 4B:
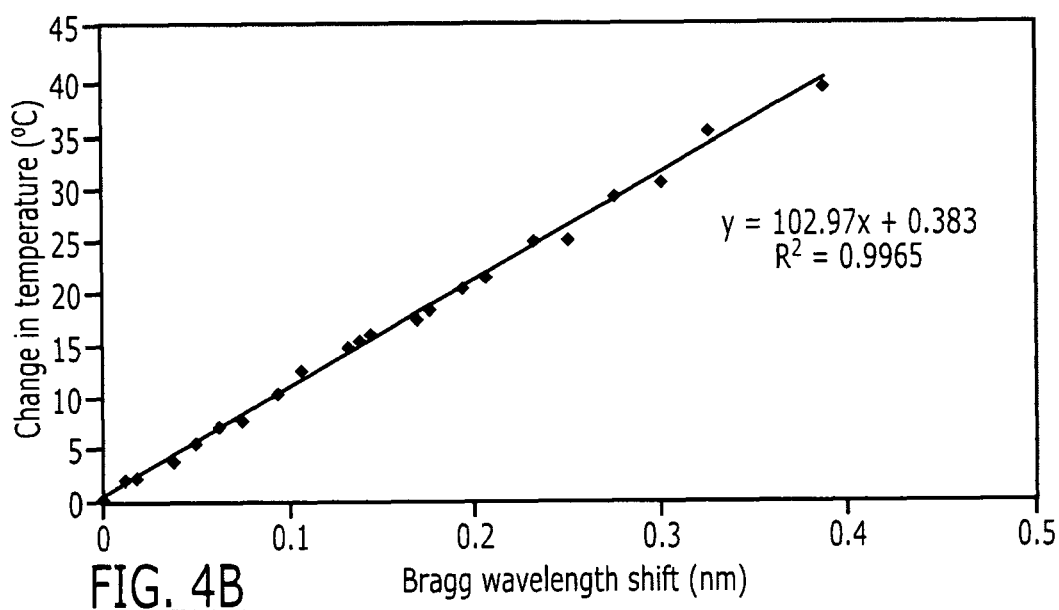

As shown in FIG. 4(B), a greater change in temperature results in a larger wavelength difference between the two gratings on the fiber optic.

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in the given claim;

b) the word "a" or "an" preceding an element does not exclude the presence of a plurality of such elements;

c) any reference signs in the claims do not limit their scope;

d) any of the disclosed devices or portions thereof may be combined together or separated into further portions unless specifically stated otherwise; and e) no specific sequence of acts or steps is intended to be required unless specifically indicated.

The invention claimed is:

1. An optical fiber transducer for simultaneous determination of pressure and temperature of a flowing fluid, comprising:
   a hollow tube for receiving the flowing fluid therethrough, wherein said tube contains:
      an optical fiber;
      two gratings on said fiber;
      a strain inducing device connected to the optical fiber between the two gratings, where the strain inducing device is configured so that fluid flowing through the hollow tube exerts pressure on the strain inducing device; and
      a plurality of clamps mounted within the tube and configured to hold the optical fiber in position within the hollow tube; and
   a fiber head connector configured to connect the optical fiber to a light source and a detector, where the fiber head connector is configured to direct light from the light source to the two gratings and to direct a reflected light signal indicative of geometric changes of the two gratings associated with the pressure and temperature of the flowing fluid to the detector;
   wherein the two gratings and the strain inducing device are arranged to be immersed in and contacting the flowing fluid.

2. The optical fiber transducer of claim 1, wherein the gratings are fiber Bragg gratings.

3. The optical fiber transducer of claim 1, wherein the plurality of clamps secure the optical fiber within the tube in such a way that the clamps exert strain on the optical fiber.

4. The optical fiber transducer of claim 1, further comprising screw slots on either end of the tube configured to allow the transducer to be inserted into an accommodating tube.

5. The optical fiber transducer of claim 1, wherein the plurality of clamps are T-shaped to provide a transverse strain free environment for the gratings and allow the flowing fluid to flow through the tube.

6. The optical fiber transducer of claim 1 wherein the hollow tube has a first aperture and a second aperture axially aligned with the first aperture and the two gratings and the strain inducing device are positioned between and axially aligned with the first and second apertures.

7. A method of simultaneous determination of pressure and temperature of a flowing fluid using an optical fiber transducer including two gratings and a strain inducing device located between the two gratings, comprising:
- securing the optical fiber transducer within a pipe so that a strain is placed on each grating;
- placing the two gratings and the strain inducing device into and in contact with fluid flowing through the pipe;
- exerting pressure on the strain inducing device by allowing the flowing fluid to flow through the pipe containing the optical fiber transducer;
- delivering an optical signal to the two gratings;
- observing the optical signal as indicative of the tensile and compressive strains exhibited by said gratings; and
- determining pressure and temperature of said flowing fluid using the tensile and compressive strains indicated by the optical signal.

8. The method of simultaneous determination of pressure and temperature of a flowing fluid of claim 7, whereby said optical signal is delivered via an optical fiber connector.

9. The method of simultaneous determination of pressure and temperature of a flowing fluid of claim 7, whereby pressure is determined by;
- subtracting the wavelength difference of said two gratings in an initial state from the wavelength difference of the two gratings in a state induced by fluid flow at room temperature;
- dividing by 2; and
- adding this resultant to the pre-strained state of the gratings.

10. The method of simultaneous determination of pressure and temperature of a flowing fluid of claim 7, whereby temperature is determined by;
- subtracting the wavelength difference of said two gratings in an initial state from the wavelength difference between said two gratings from a state of the flowing fluid during a temperature change;
- dividing by 2; and
- subtracting the resultant from the wavelength difference between a grating at a state of flowing fluid during temperature change and the grating at an initial state.

11. The method of claim 7 wherein the pipe has a first aperture and a second aperture axially aligned with the first aperture and the two gratings and the strain inducing device are positioned between and axially aligned with the first and second apertures and wherein one grating is subjected to tensile strain and the other grating is subjected to compressive stain based on direction of the flowing fluid.

\* \* \* \* \*